United States Patent
Kunkel et al.

(10) Patent No.: US 9,131,097 B2
(45) Date of Patent: Sep. 8, 2015

(54) METHOD AND SYSTEM FOR BLACK BAR IDENTIFICATION

(75) Inventors: Timo Kunkel, Campbell, CA (US); Eric Kozak, Burnaby (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 306 days.

(21) Appl. No.: 13/614,551

(22) Filed: Sep. 13, 2012

(65) Prior Publication Data

US 2013/0071034 A1  Mar. 21, 2013

Related U.S. Application Data

(60) Provisional application No. 61/535,432, filed on Sep. 16, 2011.

(51) Int. Cl.
*G06K 9/48* (2006.01)
*H04N 7/01* (2006.01)

(52) U.S. Cl.
CPC .................................. *H04N 7/0122* (2013.01)

(58) Field of Classification Search
CPC ..... H04N 19/00248; H04N 7/12; G06K 9/40; G06K 9/3283; G06K 9/48
USPC ........................... 382/199, 160, 254; 348/558
See application file for complete search history.

(56) References Cited

U.S. PATENT DOCUMENTS

| | | | |
|---|---|---|---|
| 5,309,234 A | 5/1994 | Kranawetter | |
| 5,486,871 A | 1/1996 | Filliman | |
| 6,002,797 A | 12/1999 | Mori | |
| 6,061,400 A | 5/2000 | Pearlstein | |
| 6,208,385 B1 | 3/2001 | Konishi | |
| 6,366,706 B1 | 4/2002 | Weitbruch | |
| 6,370,192 B1 * | 4/2002 | Pearlstein et al. | 375/240 |
| 6,947,097 B1 | 9/2005 | Joanblanq | |
| 7,538,821 B2 | 5/2009 | Ahn | |
| 7,920,758 B2 | 4/2011 | Ferguson | |
| 2002/0110197 A1 * | 8/2002 | Pearlstein et al. | 375/240.27 |
| 2004/0264918 A1 * | 12/2004 | Turner et al. | 386/46 |
| 2006/0139492 A1 * | 6/2006 | Ahn et al. | 348/558 |
| 2013/0279563 A1 * | 10/2013 | Li et al. | 375/240.02 |

* cited by examiner

*Primary Examiner* — Stephen R Koziol
*Assistant Examiner* — Shaghayegh Azima

(57) ABSTRACT

Black bars are determined by lines of pixels. Steps include: for each line (or subset), determining standard deviation (or product value) and a difference value, product value being proportional to M·σ, where M is pixel values mean for the line, σ standard deviation of pixel values for the line, and the difference value a difference between the standard deviation (or product) value for the line and the standard deviation (or product) value for one of the lines adjacent to the line, and determining whether any of the lines satisfies the criterion that the difference value for the line exceeds a threshold but the difference value for each other one of the lines to be displayed nearer to a first edge of the image than is the line does not exceed the threshold. Other aspects are a system or device configured (e.g., programmed) to perform any embodiment of the method.

37 Claims, 6 Drawing Sheets

METHOD AND SYSTEM FOR BLACK BAR IDENTIFICATION

CROSS REFERENCE TO RELATED APPLICATIONS

This Application claims the benefit of priority to related, Provisional U.S. Patent Application No. 61/535,432 filed on 16 Sep. 2011 entitled "Method and System for Black Bar Identification" by Timo Kunkel, et al. hereby incorporated by reference in its entirety.

BACKGROUND OF THE INVENTION

1. Field of the Invention

Typical embodiments of the invention are systems and methods for identifying black bars in images (e.g., images determined by frames of video data).

2. Background of the Invention

Throughout this disclosure including in the claims, the expression "black bar" is used to denote a block of contiguous pixels of an image determined by video data (e.g., one or more contiguous rows of pixels, or one or more contiguous columns of pixels of a video frame) which are at least substantially identical (e.g., which have the same, or substantially the same, color and luminance). For example, the pixels in a "black bar" may all be identical black pixels (having zero, or minimal luminance) or they may all have identical (or substantially identical) nonzero (or greater than minimal) luminance and identical (or substantially identical) color. A black bar may comprise non-identical pixels due to image noise, or other causes.

Throughout this disclosure including in the claims, the expression performing an operation "on" signals or data (e.g., filtering the signals or data) is used in a broad sense to denote performing the operation directly on the signals or data, or on processed versions of the signals or data (e.g., on versions of the signals that have undergone preliminary filtering prior to performance of the operation thereon).

Throughout this disclosure including in the claims, the expression "system" is used in a broad sense to denote a device, system, or subsystem. For example, a subsystem that implements a filter may be referred to as a filter system, and a system including such a subsystem (e.g., a system that generates X output signals in response to multiple inputs, in which the subsystem generates M of the inputs and the other X-M inputs are received from an external source) may also be referred to as a filter system.

Throughout this disclosure including in the claims, the noun "display" and the expression "display device" are used as synonyms to denote any device or system operable to display an image or to display video in response to an input signal. Examples of displays are computer monitors, television sets, portable devices such as tablets and phones and home entertainment system monitors or projectors.

Throughout this disclosure including in the claims, the term "processor" is used in a broad sense to denote a system or device programmable or otherwise configurable (e.g., with software or firmware) to perform operations on data (e.g., video or other image data). Examples of processors include a field-programmable gate array (or other configurable integrated circuit or chip set), a digital signal processor (e.g., a GPU) programmed and/or otherwise configured to perform pipelined processing on video or other image data, a programmable general purpose processor or computer, and a programmable microprocessor chip or chip set.

Legacy video material often contains black bars on the top and bottom (or left and right) of the displayed image to adjust the image size from one aspect ratio to another (e.g. from 16:9 to 4:3). However, when applying image processing algorithms to images containing black bars, it is typically not desirable to include the pixel values of the black bars into statistical or spatial computations. Additionally, some consumers detest black bars displayed with content and may wish a mode on their display device that automatically crops and scales images to fill the screen.

Several methods have been proposed for identifying black bars (sometimes referred to as constant blocks or black blocks) in video frames. For example, it has been proposed to compute a running average of the values of the pixels in a selected line (e.g., column) of an image, and to identify the location of a sharp change in the running average as the location of an edge (e.g., a row) of a black bar. It has also been proposed (e.g., in U.S. Pat. No. 7,538,821, issued May 26, 2009) to identify a black pixel that is contiguous to a black bar as belonging to the black bar, unless a dispersion value of a line of pixels (associated with the black pixel in question) exceeds a threshold value. If the dispersion value of the line of pixels exceeds the threshold value, the black pixel in question is assumed to belong to an image area (rather than to the black bar).

For another example, U.S. Pat. No. 6,061,400, issued May 9, 2000, describes a method in which the mean and standard deviation of the luminance values of each row of pixels of a frame are determined. If the standard deviation for a row is determined to be less than a threshold value (e.g., 5), the row is identified as a constant block. If two adjacent rows are identified as constant blocks, the difference between the mean values of the rows is calculated, and the rows are identified as belonging to the same constant block if the difference between the mean values is determined to be sufficiently small (e.g., less than 3% of the overall range of possible luminance values). U.S. Pat. No. 6,061,400 also proposes determining the strength of an identified edge of a constant block by summing the absolute differences between pairs of pixels on either side of the edge, and identifying the edge as a strong edge (rather than a weak edge) if the strength exceeds a predetermined threshold.

However, conventional methods for identifying black bars in video frames have not been robust against high levels of noise in the video data. The identification of black bars in well exposed and accurately processed digital images or video frames is relatively simple. However, when the image data (e.g., video data) indicative of these bars is degraded, conventional black bar identification methods do not reliably identify black bars in a manner that is both simple and accurate. For example, the conventional methods may incorrectly identify (as black bars) very low contrast rows and columns directly adjacent to black bars. Image data degradation can be caused by incorrect black levels, noise in the bars and blurred boundaries between image regions and the black bars.

In a class of embodiments, the invention is a method for detecting black bars in simple cases as well as under difficult conditions (e.g., in the presence of noise, blur and low contrast image margins). Typical embodiments are computationally efficient.

BRIEF DESCRIPTION OF THE INVENTION

In a first class of embodiments, the invention is a method for identifying a boundary of at least one black bar in an image determined by lines of pixels (e.g., an image determined by a frame of video data), where the pixels determine the black bar and at least one non-black image region, and said black bar is between the non-black image region and an edge of the image, said method including steps of:

(a) for each line of at least a subset of the lines, determining a standard deviation value and a difference value, where the standard deviation value is indicative of the standard deviation ($\sigma$) of pixel values for the line, and the difference value is the absolute value of the difference between the standard deviation value for said line and the standard deviation value for one of the lines adjacent to said line; and (b) determining whether any of the lines satisfies the criterion that the difference value for the line exceeds a predetermined threshold but the difference value for each other one of the lines to be displayed nearer to a first edge of the image than is said line does not exceed the threshold, and identifying one of the lines as a black bar boundary in response to determining that the difference value for said one of the lines exceeds the threshold and that the difference value, for each of the lines to be displayed nearer to the first edge than is said one of the lines, does not exceed the threshold.

In some embodiments in the first class, the method also includes a step of:

(c) determining whether any of the lines satisfies the criterion that the difference value for the line exceeds the threshold but the difference value for each other one of the lines to be displayed nearer to a second edge of the image than is said line does not exceed the threshold, where the second edge and the first edge of the image are opposite edges of the image, and identifying one of the lines as a second black bar boundary in response to determining that the difference value for said one of the lines exceeds the threshold and that the difference value for each of the lines to be displayed nearer to the second edge than is said one of the lines does not exceed the threshold.

In typical embodiments in the first class, each of the pixel values for each line is a monochromatic value generated in response to one of the pixels in the line. For example, in some embodiments each monochromatic value is the sum of color components of a different one of the pixels in the line, and each standard deviation value determined in step (a) is the standard deviation of the summed color components of the pixels of one of the lines. In some embodiments in the first class, each of the pixel values for each line is a luminance value of a different one of the pixels in the line, and each standard deviation value determined in step (a) is the standard deviation of luminance values of the pixels of one of the lines.

In some embodiments in the first class that include steps (a) and (b) but not step (c), and some embodiments in the first class that include steps (a), (b), and (c), the method also includes a step of:

(d) for each line of at least a subset of the lines, determining a product value, M·$\sigma$, and a product difference value, where M is the mean of pixel values for said line, $\sigma$ is the standard deviation of the pixel values for said line, and the product difference value is the absolute value of the difference between the product value for said line and the product value for one of the lines adjacent to said line, and if none of the lines has been identified as a black bar boundary in step (b), identifying one of the lines as a black bar boundary in response to determining that the product difference value for said one of the lines exceeds a predetermined second threshold (which may, but need not, be identical to the threshold recited in step (b)) and that the product difference value, for each of the lines to be displayed nearer to the first edge than is said one of the lines, does not exceed the second threshold.

In some embodiments that include steps (b) and (c), the method also includes a step of: identifying black bars between the first edge of the image and the black bar boundary and between the second edge of the image and the second black bar boundary, in response to identifying one of the lines as the black bar boundary in step (b), and identifying another one of the lines as the second black bar boundary in step (c), and (optionally also) determining that the black bar boundary and the second black bar boundary satisfy a symmetry criterion. One example of the symmetry criterion is that the black bar boundary is N lines from the first edge of the image, the second black bar boundary is M lines from the second edge of the image, and the absolute value of the difference between N and M is not greater than a predetermined value.

In some embodiments in the first class that include steps (b) and (c) but not step (d), the method also includes a step of:

(e) if steps (b) and (c) do not result in identification of one of the lines as the black bar boundary and another one of the lines as the second black bar boundary, determining for each line of at least a subset of the lines, a product value, M·$\sigma$, and a product difference value, where M is the mean of pixel values for said line, $\sigma$ is the standard deviation of the pixel values for said line, and the product difference value is the absolute value of the difference between the product value for said line and the product value for one of the lines adjacent to said line, identifying one of the lines as the black bar boundary in response to determining that the product difference value for said one of the lines exceeds a predetermined second threshold (which may, but need not, be identical to the threshold recited in step (b)) and that the product difference value, for each of the lines to be displayed nearer to the first edge than is said one of the lines, does not exceed the second threshold, and identifying another one of the lines as the second black bar boundary in response to determining that the product difference value for said another one of the lines exceeds the second threshold and that the product difference value, for each of the lines to be displayed nearer to the second edge than is said another one of the lines, does not exceed the second threshold.

In some embodiments in the first class that include step (e), the method also includes a step of:

(f) identifying black bars between the first edge of the image and the black bar boundary and between the second edge of the image and the second black bar boundary, in response to identifying one of the lines as the black bar boundary in step (e), and identifying another one of the lines as the second black bar boundary in step (e), and (optionally also) determining that the black bar boundary and the second black bar boundary satisfy a symmetry criterion. One example of the symmetry criterion is that the black bar boundary is N lines from the first edge of the image, the second black bar boundary is M lines from the second edge of the image, and the absolute value of the difference between N and M is not greater than a predetermined value.

In a second class of embodiments, the invention is a method for identifying a boundary of at least one black bar in an image determined by lines of pixels (e.g., an image determined by a frame of video data), where the pixels determine the black bar and at least one non-black image region, and said black bar is between the non-black image region and an edge of the image, said method including steps of:

(a) for each line of at least a subset of the lines, determining a product value and a difference value, where the product value is proportional to (e.g., identical to) M·$\sigma$, where M is the mean of pixel values for the line, $\sigma$ is the standard deviation of the pixel values for the line, and the difference value is the absolute value of the difference between the product value for said line and the product value for one of the lines adjacent to said line; and (b) determining whether any of the lines satisfies the criterion that the difference value for the line exceeds a predetermined threshold but the difference value for each other one of the lines to be displayed nearer to a first edge of the image than is said line does not exceed the threshold, and identifying one of the lines as a black bar boundary in response to determining that the difference value for said one of the lines exceeds the threshold and that the difference value, for each of the lines to be displayed nearer to the first edge than is said one of the lines, does not exceed the threshold.

In some embodiments in the second class, the method also includes a step of:

(c) determining whether any of the lines satisfies the criterion that the difference value for the line exceeds the threshold but the difference value for each other one of the lines to be displayed nearer to a second edge of the image than is said line does not exceed the threshold, where the second edge and the first edge of the image are opposite edges of the image, and identifying one of the lines as a second black bar boundary in response to determining that the difference value for said one of the lines exceeds the threshold and that the difference value for each of the lines to be displayed nearer to the second edge than is said one of the lines does not exceed the threshold.

In typical embodiments in the second class, each of the pixel values for each line is a monochromatic value generated in response to one of the pixels in the line. For example, in some embodiments each monochromatic value is the sum of color components of a different one of the pixels in the line, each mean value determined in step (a) is the mean of the summed color components of the pixels of one of the lines, and each standard deviation value determined in step (a) is the standard deviation of the summed color components of the pixels of one of the lines. In some embodiments in the first class, each of the pixel values for each line is a luminance value of a different one of the pixels in the line, each mean value determined in step (a) is the mean of luminance values of the pixels of one of the lines, and each standard deviation value determined in step (a) is the standard deviation of luminance values of the pixels of one of the lines.

In some embodiments in the second class that include steps (b) and (c), the method also includes a step of:

(d) identifying black bars between the first edge of the image and the black bar boundary and between the second edge of the image and the second black bar boundary, in response to identifying one of the lines as the black bar boundary in step (b), and identifying another one of the lines as the second black bar boundary in step (c), and (optionally also) determining that the black bar boundary and the second black bar boundary satisfy a symmetry criterion. One example of the symmetry criterion is that the black bar boundary is N lines from the first edge of the image, the second black bar boundary is M lines from the second edge of the image, and the absolute value of the difference between N and M is not greater than a predetermined value.

Typical embodiments of the invention are implemented in software, e.g., by a programmed processor which runs the software (e.g., to assist in improving the efficiency of other imaging algorithms performed by the processor). It is contemplated that some embodiments of the invention are included in imaging algorithms implemented by consumer displays (e.g., by an appropriately programmed processor in a consumer display) for the purpose of enhancing user enjoyment, or in the case of plasma TVs (or other displays that wear) for the purpose of reducing the chance of pixels in common black bar regions from appearing differently over time compared to pixels in the center of the display.

Other aspects of the invention include a system or device configured (e.g., programmed) to perform any embodiment of the inventive method, and a computer readable medium (e.g., a disc) which stores code for implementing any embodiment of the inventive method. For example, the inventive device can include a programmable GPU (or digital signal processor), or a programmable general purpose processor or microprocessor, programmed with software or firmware and/or otherwise configured to perform any of a variety of operations on data, including an embodiment of the inventive method. Such a general purpose processor may be or include a computer system including an input device, a memory, and a graphics card that is programmed (and/or otherwise configured) to perform an embodiment of the inventive method in response to data asserted thereto.

DETAILED DESCRIPTION OF THE PREFERRED EMBODIMENTS

Many embodiments of the present invention are technologically possible. It will be apparent to those of ordinary skill in the art from the present disclosure how to implement them.

Embodiments of the inventive system and method will be described with reference to FIGS. 1, 2A, 2B, 3A, 3B, 4A, 4B, 5A, 5B, 6A and 6B.

Figure 1:
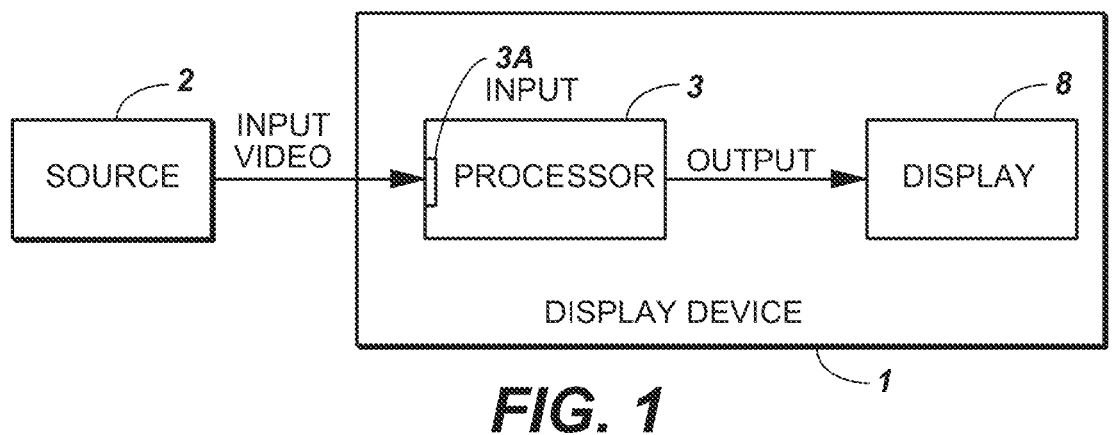
FIG. 1 is a block diagram of a system including an embodiment of the inventive processor.

FIG. 1 is a block diagram of an embodiment of the inventive system. The system of FIG. 1 includes display device 1 configured to display images sequentially in response to a video input data from source 2. Display device 1 may be implemented as any of a variety of display devices, (e.g., a standard LED or LCD display, or another display device).

Video processor 3 has at least one input 3A coupled to receive video input data (image data) from source 2, and a processing subsystem coupled to the input and configured (e.g., programmed) to perform required processing on the input data to generate a video output signal for driving the pixels of display screen 8 of device 1. The processing subsystem of processor 3 (which may be all of processor 3 other than input 3A) is also configured (e.g., programmed) to perform any embodiment of the inventive method, e.g., to generate data indicative of the location(s) of each of one or more black bars in images determined by the video input data for use in generating the video output signal. Processor 3 is shown in FIG. 1 as a subsystem of display device 1. Alternatively, processor 3 is implemented separately from a display device (e.g., as a device separate from but coupled to display device 1).

In some embodiments, processor 3 is configured to perform any of a first class of embodiments of the inventive method. In the first class of embodiments, the invention is a method for identifying a boundary of at least one black bar in an image determined by lines of pixels (e.g., an image determined by a frame of video input data from source 2), where the pixels determine the black bar and at least one non-black image region, and the black bar is located between the non-black image region and an edge of the image. Typically, the lines are rows (or columns) of a rectangular array of pixels.

Figure 1A:
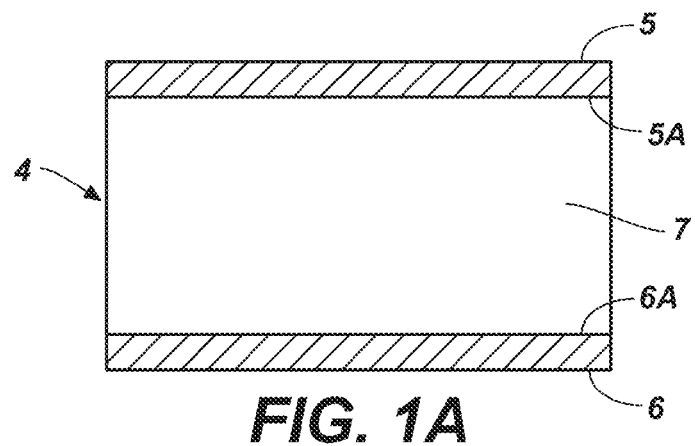
FIG. 1A is an image (determined by a frame of video data) comprised of pixels arranged in rows and columns, and having top and bottom black bars which can be identified in accordance with an embodiment of the invention.

For example, image 4 of FIG. 1A has two black bars (5 and 6) whose boundaries can be identified in accordance with the invention. This image is determined by an array of pixels arranged in 1080 rows and approximately 2000 columns. The pixels of image 4 determine top black bar 5 (in the area including pixel rows 1 through N, where N is in the range from 100 to 200), bottom black bar 6 (in the area including pixel rows 1080 through 1080-M, where M is in the range from 100 to 200), and non-black image region 7 between the two black bars. The "N"th row of pixels, identified in FIG. 1A as row 5A, is the boundary between black bar 5 and image region 7. The "(1080-M)"th row of pixels, identified in FIG. 1A as row 6A, is the boundary between black bar 6 and image region 7. It is assumed that the pixels in the black bars have zero luminance, so that the black bars are easily distinguishable from the non-black image region.

Each method in the first class of embodiments includes steps of:

(a) for each line (e.g., row or column) of at least a subset of the lines, determining a standard deviation value and a difference value, where the standard deviation value is indicative of the standard deviation ($\sigma$) of pixel values for the line, and the difference value is the absolute value of the difference between the standard deviation value for said line and the standard deviation value for one of the lines adjacent to said line; and (b) determining whether any of the lines satisfies the criterion that the difference value for the line exceeds a predetermined threshold but the difference value for each other one of the lines to be displayed nearer to a first edge of the image than is said line does not exceed the threshold, and identifying one of the lines as a black bar boundary in response to determining that the difference value for said one of the lines exceeds the threshold and that the difference value, for each of the lines to be displayed nearer to the first edge than is said one of the lines, does not exceed the threshold.

Figure 2B:
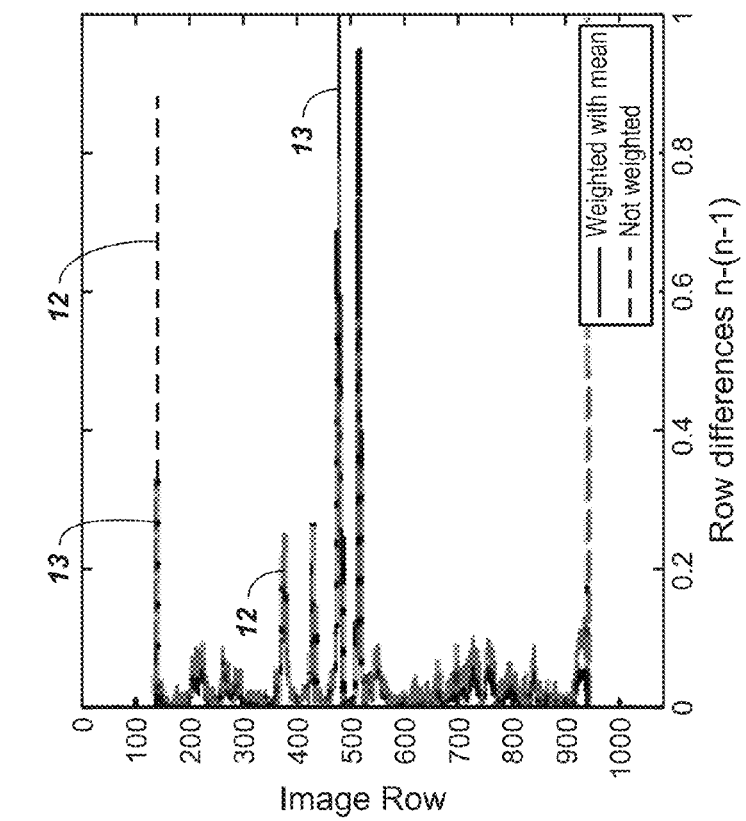
FIG. 2B is a graph of difference and product difference values generated in accordance with an embodiment of the invention in response to the image of FIG. 1A.
Figure 2A:
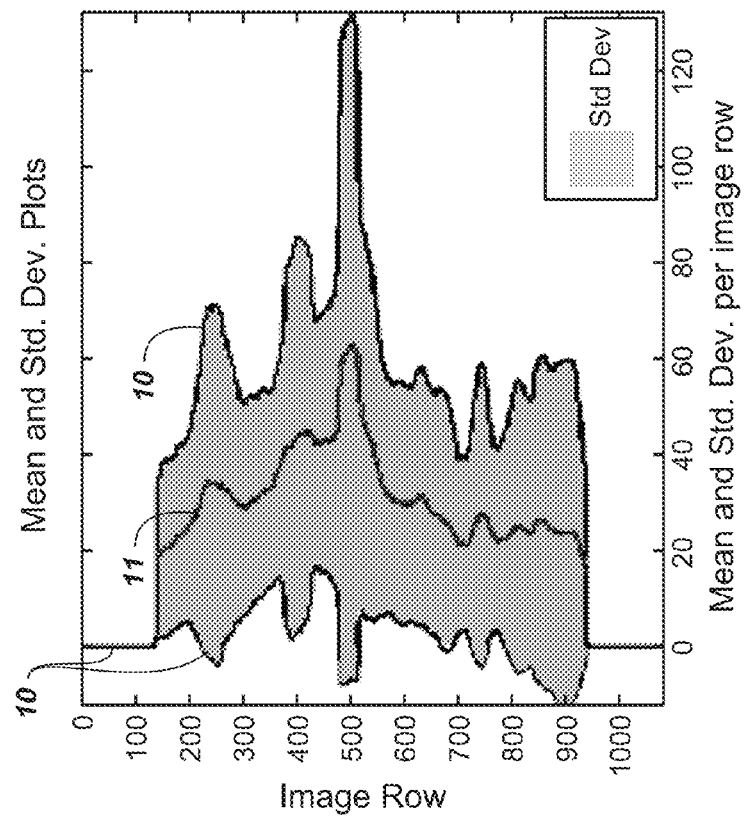
FIG. 2A is a graph of mean and standard deviation values generated in accordance with an embodiment of the invention in response to the image of FIG. 1A.

For example, when processing the pixels of image 4 (of FIG. 1A), an implementation of processor 3 is programmed to determine standard deviation values of the type recited in step (a), which are plotted as a function of row number as plot 10 of FIG. 2A. This implementation of processor 3 is also programmed to determine difference values of the type recited in step (a), which are plotted as a function of row number as plot 12 of FIG. 2B. This implementation of processor 3 is also programmed to identify, as a black bar boundary, the row (row 5A of FIG. 1A) at which the uppermost peak of plot 12 occurs, in response to determining that the difference value for this row exceeds a predetermined threshold value and determining that the difference value for each of the rows of pixels to be displayed above this row (nearer to the top edge of the image than this row) does not exceed the threshold value.

In some embodiments in the first class, the inventive method also includes a step of:

(c) determining whether any of the lines satisfies the criterion that the difference value for the line exceeds the threshold but the difference value for each other one of the lines to be displayed nearer to a second edge of the image than is said line does not exceed the threshold, where the second edge and the first edge of the image are opposite edges of the image, and identifying one of the lines as a second black bar boundary in response to determining that the difference value for said one of the lines exceeds the threshold and that the difference value for each of the lines to be displayed nearer to the second edge than is said one of the lines does not exceed the threshold.

For example, when processing the pixels of image 4 (of FIG. 1A), an implementation of processor 3 is programmed to identify, as a second black bar boundary, the row (row 6A of FIG. 1A) at which the lowest peak of plot 12 occurs (i.e., the peak associated with the highest row number), in response to determining that the difference value for this row exceeds the above-mentioned predetermined threshold value and determining that the difference value for each of the rows of pixels to be displayed below this row (nearer to the bottom edge of the image than this row) does not exceed this threshold value.

In some embodiments in the first class that include steps (b) and (c), the method includes a step of: identifying a black bar between the first edge of the image and the black bar boundary and another black bar between the second edge of the image and the second black bar boundary, in response to identifying one of the lines as the black bar boundary in step (b) and identifying another one of the lines as the second black bar boundary in step (c). In typical embodiments in the first class that include steps (b) and (c), the method includes a step of: identifying a black bar between the first edge of the image and the black bar boundary and another black bar between the second edge of the image and the second black bar boundary, in response to identifying one of the lines as the black bar boundary in step (b), identifying another one of the lines as the second black bar boundary in step (c), and determining that the black bar boundary and the second black bar boundary satisfy a symmetry criterion. For example, processor 3 may be configured to implement one such typical embodiment, in which the symmetry criterion is that the black bar boundary (e.g., row 5A) is N lines from a first (e.g., top) edge of the image, the second black bar boundary (e.g., row 6A) is M lines from a second (e.g., bottom) edge of the image, and the absolute value of the difference between N and M is not greater than a predetermined value (e.g., a small number of rows).

In typical embodiments in the first class (and in the second class to be described below), each of the recited "pixel values" is a monochromatic value generated (e.g., by processor 3) in response to one of the pixels that determine the image. For example, in some embodiments processor 3 generates each monochromatic value as the sum (e.g., a weighted or scaled sum) of color components of a different one of the input video pixels, and determines each standard deviation value (recited in step (a)) as the standard deviation of the summed color components of the pixels of one of the lines of input video pixels, and optionally also determines each mean value as the mean of the summed color components of the pixels of one of the lines of input video pixels. In some embodiments in the first (or second) class, each of the recited pixel values is a luminance value (e.g., a scaled luminance value) of a different one of the pixels of the input video pixels (e.g., each where pixel of the input video comprises a luminance value and two chrominance values), and processor 3 generates each standard deviation value (recited in step (a)) as the standard deviation of luminance values of the pixels of one of the lines of input video pixels.

In some embodiments in the first class, the inventive method also includes a step of:

(d) for each line of at least a subset of the lines, determining a product value, M·σ, and a product difference value, where M is the mean of pixel values for said line, σ is the standard deviation of the pixel values for said line, and the product difference value is the absolute value of the difference between the product value for said line and the product value for one of the lines adjacent to said line, and if none of the lines has been identified as a black bar boundary in step (b), identifying one of the lines as a black bar boundary in response to determining that the product difference value for said one of the lines exceeds the threshold and that the product difference value, for each of the lines to be displayed nearer to the first edge than is said one of the lines, does not exceed the threshold.

For example, when processing the pixels of image 4 (of FIG. 1A), an implementation of processor 3 is programmed to determine mean values (M), standard deviation values (σ), and product values (M·σ) of the type recited in step (d). Such mean values are plotted as a function of row number as plot 11 of FIG. 2A. This implementation of processor 3 is also programmed to determine product difference values of the type recited in step (d), which are plotted as a function of row number as plot 13 of FIG. 2B. This implementation of processor 3 is also programmed to identify, as a black bar boundary, the row (row 5A of FIG. 1A) at which the uppermost peak of plot 13 occurs (the peak nearest to the top edge of the image), in response to determining that the product difference value for this row exceeds a predetermined threshold value and determining that the product difference value for each of the rows of pixels to be displayed above this row (nearer to the top edge of the image than this row) does not exceed the threshold value.

In some embodiments in the first class that include steps (b) and (c) but not step (d), the method also includes a step of:

(e) if steps (b) and (c) do not result in identification of one of the lines as the black bar boundary and another one of the lines as the second black bar boundary, determining for each line of at least a subset of the lines, a product value, M·σ, and a product difference value, where M is the mean of pixel values for said line, σ is the standard deviation of the pixel values for said line, and the product difference value is the absolute value of the difference between the product value for said line and the product value for one of the lines adjacent to said line, identifying one of the lines as the black bar boundary in response to determining that the product difference value for said one of the lines exceeds the threshold and that the product difference value, for each of the lines to be displayed nearer to the first edge than is said one of the lines, does not exceed the threshold, and identifying another one of the lines as the second black bar boundary in response to determining that the product difference value for said another one of the lines exceeds the threshold and that the product difference value, for each of the lines to be displayed nearer to the second edge than is said another one of the lines, does not exceed the threshold.

For example, when processing the pixels of an image, an implementation of processor 3 is programmed to determine mean values (M), standard deviation values (σ), and product values (M·σ) of the type recited in step (d). This implementation of processor 3 is also programmed to determine product difference values of the type recited in step (d). If steps (b) and (c) of the method do not result in identification of any of the rows as a black bar boundary and any other one of the rows as a second black bar boundary, this implementation of processor 3 is programmed to identify a row as a black bar boundary, in response to determining that the product difference value for this row exceeds a predetermined threshold value and determining that the product difference value for each of the rows of pixels to be displayed above this row (nearer to the top edge of the image than this row) does not exceed the threshold value, and to identify another row as a second black bar boundary, in response to determining that the product difference value for this other row exceeds the threshold value and determining that the product difference value for each of the rows of pixels to be displayed below this other row (nearer to the bottom edge of the image than the row) does not exceed the threshold value In some embodiments in the first class that include step (e), the method also includes a step of:

(f) identifying black bars between the first edge of the image and the black bar boundary and between the second edge of the image and the second black bar boundary, in response to identifying one of the lines as the black bar boundary in step (e), and identifying another one of the lines as the second black bar boundary in step (e), and (optionally also) determining that the black bar boundary and the second black bar boundary satisfy a symmetry criterion.

One example of the symmetry criterion is that the black bar boundary is N lines from the first edge of the image, the second black bar boundary is M lines from the second edge of the image, and the absolute value of the difference between N and M is not greater than a predetermined value. For example, when processing the pixels of an image, an implementation of processor 3 is programmed to implement such an embodiment, in which the symmetry criterion is that the black bar boundary is N lines from a first (e.g., top) edge of the image, the second black bar boundary is M lines from a second (e.g., bottom) edge of the image, and the absolute value of the difference between N and M is not greater than a predetermined value (e.g., a small number of rows).

In some embodiments, processor 3 is configured to perform any of a second class of embodiments of the inventive method. In the second class of embodiments, the invention is a method for identifying a boundary of at least one black bar in an image determined by lines of pixels (e.g., an image determined by a frame of video data), where the pixels determine the black bar and at least one non-black image region, and said black bar is between the non-black image region and an edge of the image, said method including steps of:

(a) for each line of at least a subset of the lines, determining a product value and a difference value, where the product value is proportional to (e.g., identical to) M·σ, where M is the mean of pixel values for the line, σ is the standard deviation of the pixel values for the line, and the difference value is the absolute value of the difference between the product value for said line and the product value for one of the lines adjacent to said line; and (b) determining whether any of the lines satisfies the criterion that the difference value for the line exceeds a predetermined threshold but the difference value for each other one of the lines to be displayed nearer to a first edge of the image than is said line does not exceed the threshold, and identifying one of the lines as a black bar boundary in response to determining that the difference value for said one of the lines exceeds the threshold and that the difference value, for each of the lines to be displayed nearer to the first edge than is said one of the lines, does not exceed the threshold.

For example, an implementation of processor 3 is programmed to determine (when processing the pixels of image 4 (of FIG. 1A) mean values (M), standard deviation values (σ), and product values (M·σ) of the type recited in step (a). Such mean values are plotted as a function of row number as plot 11 of FIG. 2A, and such standard deviation values are plotted as a function of row number as plot 10 of FIG. 2A. This implementation of processor 3 is also programmed to determine difference values of the type recited in step (a), which are plotted as a function of row number as plot 13 of FIG. 2B. This implementation of processor 3 is also programmed to identify, as a black bar boundary, the row (row 5A of FIG. 1A) at which the uppermost peak of plot 13 occurs (the peak nearest to the top edge of the image), in response to determining that the difference value for this row exceeds a predetermined threshold value and determining that the difference value for each of the rows of pixels to be displayed above this row (nearer to the top edge of the image than this row) does not exceed the threshold value.

In some embodiments in the second class, the method also includes a step of:

(c) determining whether any of the lines satisfies the criterion that the difference value for the line exceeds the threshold but the difference value for each other one of the lines to be displayed nearer to a second edge of the image than is said line does not exceed the threshold, where the second edge and the first edge of the image are opposite edges of the image, and identifying one of the lines as a second black bar boundary in response to determining that the difference value for said one of the lines exceeds the threshold and that the difference value for each of the lines to be displayed nearer to the second edge than is said one of the lines does not exceed the threshold.

For example, an implementation of processor 3 is programmed to determine (when processing the pixels of image 4 (of FIG. 1A) difference values of the type recited in step (a), which are plotted as a function of row number as plot 13 of FIG. 2B. This implementation of processor 3 is also programmed to identify, as a black bar boundary, the row (row 5A of FIG. 1A) at which the uppermost peak of plot 13 occurs (the peak nearest to the top edge of the image), in response to determining that the difference value for this row exceeds a predetermined threshold value and that the difference value for each of the rows of pixels to be displayed above this row (nearer to the top edge of the image than this row) does not exceed the threshold value, and to identify, as a second black bar boundary, the row (row 6A of FIG. 1A) at which the lowest peak of plot 13 occurs (the peak nearest to the bottom edge of the image), in response to determining that the difference value for this row exceeds the threshold value and that the difference value for each of the rows of pixels to be displayed below this row (nearer to the bottom edge of the image than this row) does not exceed the threshold value.

In some embodiments in the second class that include steps (b) and (c), the method includes a step of: identifying a black bar between the first edge of the image and the black bar boundary and another black bar between the second edge of the image and the second black bar boundary, in response to identifying one of the lines as the black bar boundary in step (b) and identifying another one of the lines as the second black bar boundary in step (c). In typical embodiments in the second class that include steps (b) and (c), the method includes a step of: identifying a black bar between the first edge of the image and the black bar boundary and another black bar between the second edge of the image and the second black bar boundary, in response to identifying one of the lines as the black bar boundary in step (b), identifying another one of the lines as the second black bar boundary in step (c), and determining that the black bar boundary and the second black bar boundary satisfy a symmetry criterion. For example, processor 3 may be configured to implement one such typical embodiment, in which the symmetry criterion is that the black bar boundary (e.g., row 5A) is N lines from a first (e.g., top) edge of the image, the second black bar boundary (e.g., row 6A) is M lines from a second (e.g., bottom) edge of the image, and the absolute value of the difference between N and M is not greater than a predetermined value (e.g., a small number of rows).

Typical embodiments of the invention are implemented in software, e.g., by a programmed processor which runs the software (e.g., to assist in improving the efficiency of other imaging algorithms performed by the processor). It is contemplated that some embodiments of the invention are included in imaging algorithms implemented by consumer displays (e.g., where display device 1 of FIG. 1 is a consumer display, by an appropriately programmed processor 3 in display device 1) for the purpose of enhancing user enjoyment, or in the case of plasma TVs (or other displays that wear) for the purpose of reducing the chance of pixels in common black bar regions from appearing differently over time compared to pixels in the center of the display.

Exemplary cases underlining the robustness of the typical embodiments of the inventive method will be described with reference to FIGS. 3A, 3B, 4A, 4B, 5A, 5B, 6A, and 6B.

Figures 3A, 3B:
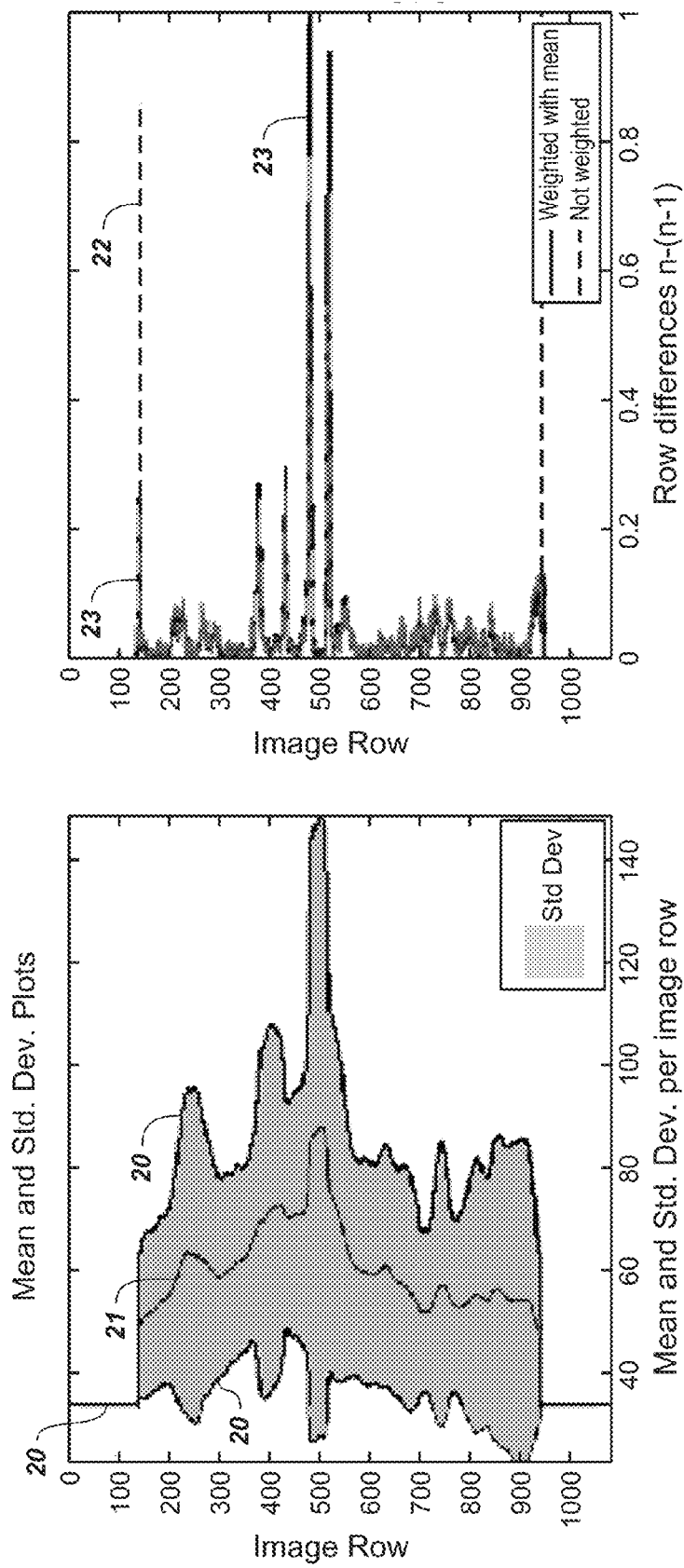
FIG. 3A is a graph of mean and standard deviation values generated in accordance with an embodiment of the invention in response to a second image (determined by a frame of video data).
FIG. 3B is a graph of difference and product difference values generated in accordance with an embodiment of the invention in response to the second image.

FIG. 3A is a graph of mean and standard deviation values generated in accordance with an embodiment of the invention in response to a second image (determined by a frame of video data). The second image differs from image 4 of FIG. 1A only in that its top and bottom black bars are lighter (tone value 35) than the zero luminance values of the black bars of image 4. Such relatively lighter black bars can occur if the video black point is not accurately set.

FIG. 3B is a graph of difference and product difference values generated in accordance with an embodiment of the invention in response to the second image. FIG. 4A is a graph of mean and standard deviation values generated in accordance with an embodiment of the invention in response to a third image (determined by a frame of video data). The third image differs from image 4 of FIG. 1A in that the bottom rows of its image content (its central non-black image region, between its top and bottom black bars) are very dark and could therefore be misinterpreted as part of the black bars. In accordance with the present invention, these bottom rows of the image content are accurately classified as belonging to the image rather than to the black bars. This is a more difficult case, in the sense that the top and bottom black bars of the image are less easily distinguishable from the non-black image region than are the black bars of image 4.

Figure 4B:
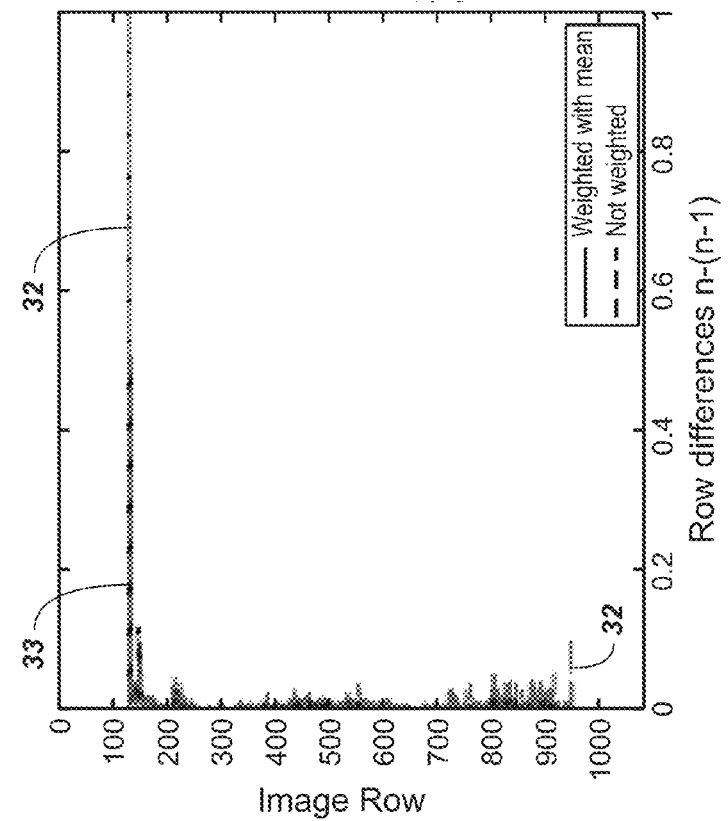
FIG. 4B is a graph of difference and product difference values generated in accordance with an embodiment of the invention in response to the third image.
Figure 4A:
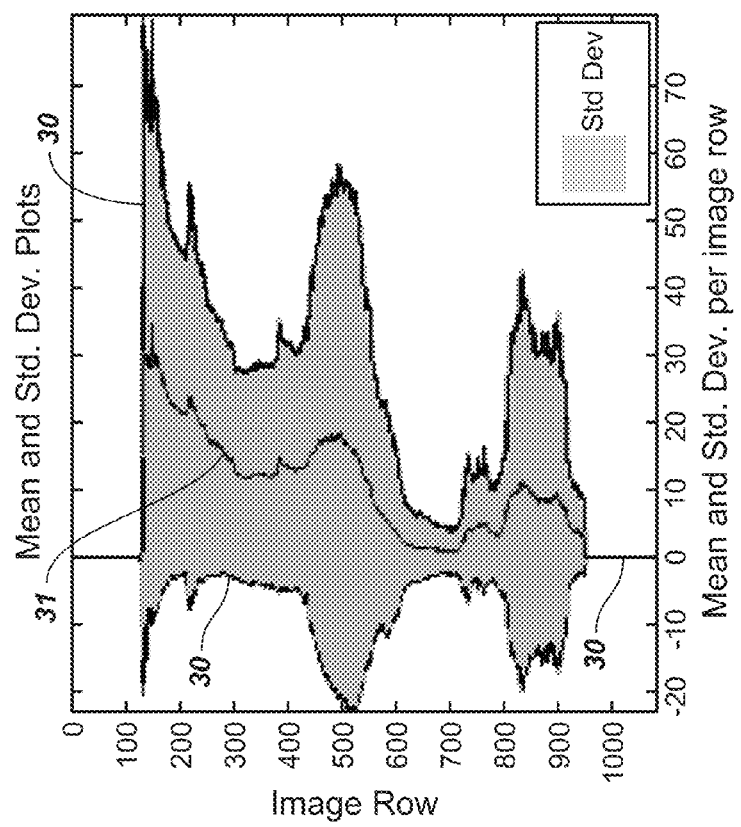
FIG. 4A is a graph of mean and standard deviation values generated in accordance with an embodiment of the invention in response to a third image (determined by a frame of video data).

FIG. 4B is a graph of difference and product difference values generated in accordance with an embodiment of the invention in response to the third image. FIG. 5A is a graph of mean and standard deviation values generated in accordance with an embodiment of the invention in response to a fourth image (determined by a frame of video data). The fourth image differs from image 4 of FIG. 1A in that its central non-black image region (between its top and bottom black bars) has been spatially low pass filtered (blurred) and noise has been applied to the image region and the black bars. This is an extreme case in which there is a lot of noise both in the image and the black bars. Also, the transition between the black bars and image region is a gradient. In accordance with the present invention, the black bars are accurately distinguished from the image content. However, the weighted difference plot 33 (described below) of FIG. 4B, which is generated in accordance with the invention, does not indicate the bottom black bar, whereas non-weighted standard deviation difference plot 32 (described below) of FIG. 4B, also generated in accordance with the invention, does indicate both the top and bottom black bars.

Figure 5B:
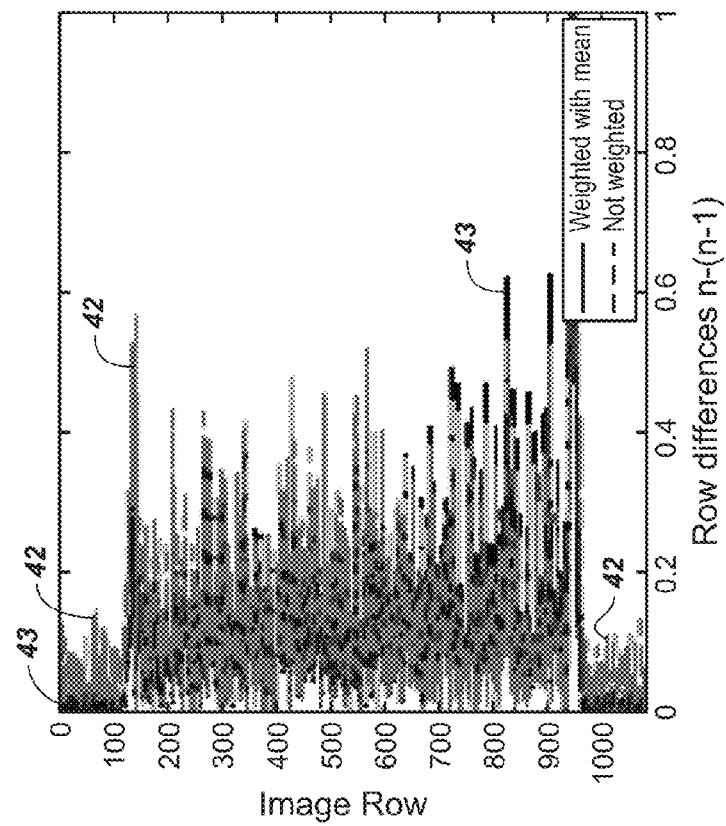
FIG. 5B is a graph of difference and product difference values generated in accordance with an embodiment of the invention in response to the fourth image.
Figure 5A:
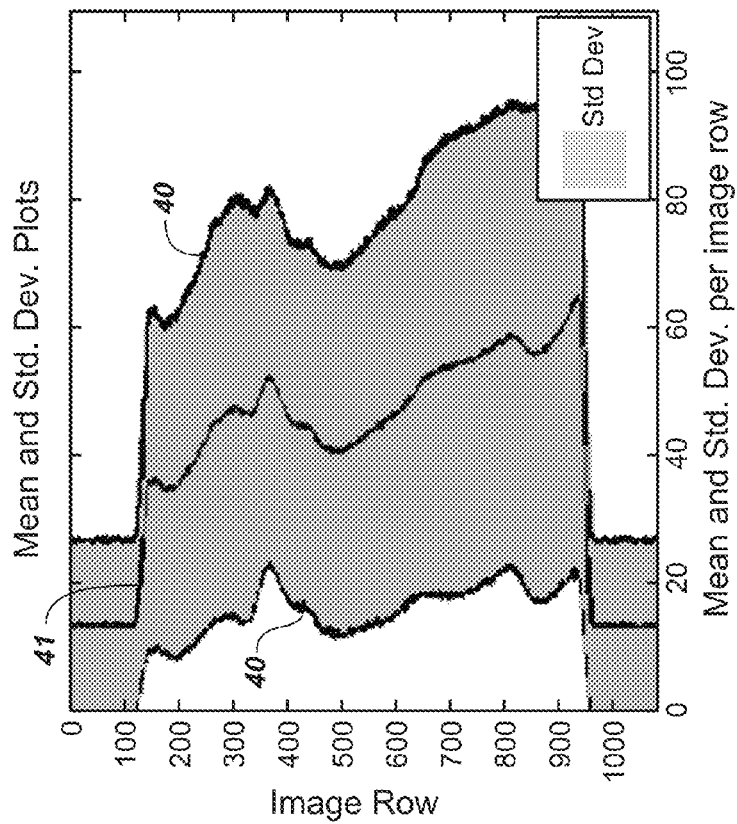
FIG. 5A is a graph of mean and standard deviation values generated in accordance with an embodiment of the invention in response to a fourth image (determined by a frame of video data).

FIG. 5B is a graph of difference and product difference values generated in accordance with an embodiment of the invention in response to the fourth image. FIG. 6A is a graph of mean and standard deviation values generated in accordance with an embodiment of the invention in response to a fifth image (determined by a frame of video data). The fifth image differs from image 4 of FIG. 1A in that it does not have black bars. Instead, its image region has black sky (at the top) which could be misinterpreted as a black bar. However, since the symmetry of candidate black bars at the top and bottom of the image is tested (in the manner described below with reference to the described pseudocode) in the embodiment of the inventive method applied to this image, this scene is correctly identified in accordance with the invention as not having black bars above and below it.

Figure 6B:
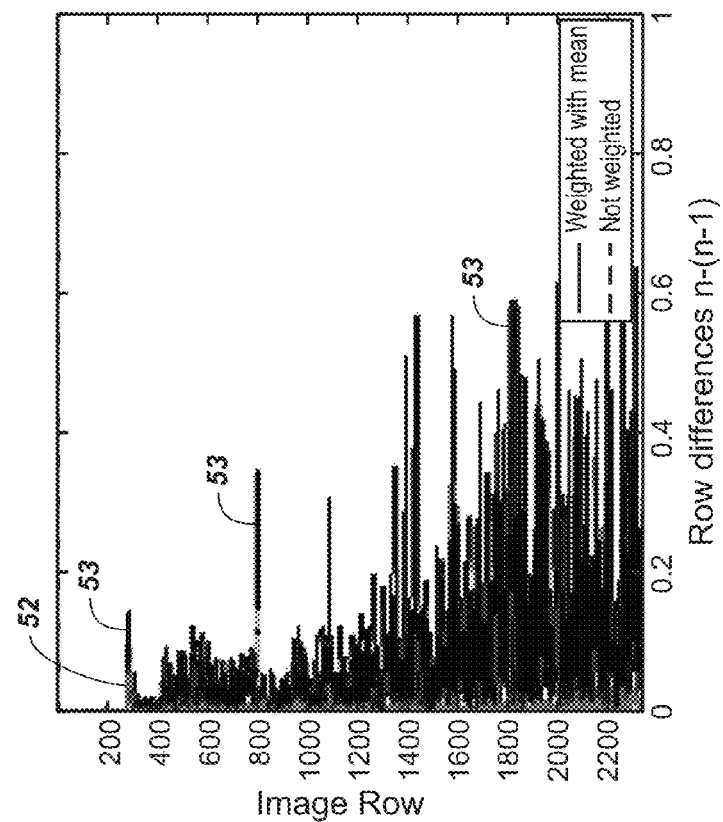
FIG. 6B is a graph of difference and product difference values generated in accordance with an embodiment of the invention in response to the fifth image.
Figure 6A:
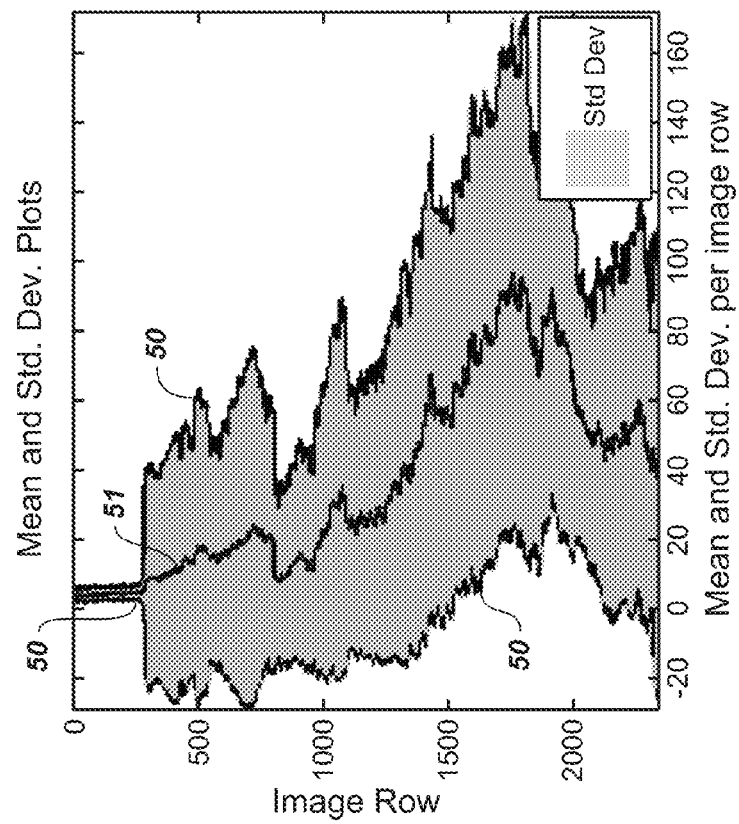
FIG. 6A is a graph of mean and standard deviation values generated in accordance with an embodiment of the invention in response to a fifth image (determined by a frame of video data).

FIG. 6B is a graph of difference and product difference values generated in accordance with an embodiment of the invention in response to the fifth image.

The graph of each of FIGS. 2A, 3A, 4A, 5A, and 6A includes a plot (11, 21, 31, 41, 51, or 61) of the mean for each row of the relevant image, and a plot (10, 20, 30, 40, 50, or 60) of the standard deviation for each such row.

The graph of each of FIGS. 2B, 3B, 4B, 5B, and 6B includes a plot (13, 23, 33, 43, 53, or 63) of the absolute value of the difference between the product ($M_i \cdot \sigma_i$) of mean ($M_i$) and standard deviation ($\sigma_i$) values for each row (the "i"th row) of the relevant image and the product ($M_{i+1} \cdot \sigma_{i+1}$) of the mean and standard deviation values of the next row (the "i+1"th row) of the image. These product difference values are plotted as a function of row number. The graph of each of FIGS. 2B, 3B, 4B, 5B, and 6B also includes a plot (12, 22, 32, 42, 52, or 62) of the absolute value of the difference between the standard deviation ($\sigma_i$) value for each row (the "i"th row) of the relevant image and the standard deviation value of the next row (the "i+1"th row) of the image. These difference values are plotted as a function of row number. High peaks in these plots indicate large difference values.

It should be appreciated that in some extreme cases, it may not be possible to determine in accordance with the invention whether symmetric black areas at the top and bottom of a scene are actually black bars or part of the scene. In cases in which video frames contain a lot of black and detection of black bars becomes difficult, information from previous frames may be used to determine (or assist in determining) presence of black bars (e.g., it may be assumed that if black bars have been identified at the top and bottom of previous frames of a video program, then all subsequent frames of the video program have the same black bars at their top and bottom).

In some embodiments, the invention determines the presence of four black bars (at the left, right, top, and bottom of a scene). The left/right and top/bottom black bar pairs do not have to show the same statistical properties (e.g., same mean intensity, and/or same noise intensity/spatial frequency).

What follows is pseudocode which determines an embodiment of the inventive black bar detection method. In the pseudocode, the symbol "%" is a marker indicating that a comment follows the marker. In order to detect both horizontal and vertical black bars, the code is executed twice: once on rows and once on columns (i.e., with each reference to a row replaced by a reference to a column, and each reference to a top or bottom edge of the image replaced by a reference to a left or right edge of the image):

```
colImg = Open Image; % an image comprising rows and columns of pixels is
        provided.
lumImg = weight(colImg); % each pixel of the image is converted to a
        monochromatic value. For example, if each pixel comprises Red, Green,
        and Blue color components, the monochromatic value for each pixel may
        be is the sum of color components of the pixels. For another example, if
        each pixel comprises a luminance value and chrominance values, the
        monochromatic value for each pixel may be the pixel's luminance value.
for i=1 to AmountOfRows(lumImg)    % loop through all rows of the image
    ImgMean(i) = mean(lumImg(i));       % determine the mean of the monochromatic
        values of the ith row.
    ImgStd(i) = stDev(lumImg(i)); % determine the standard deviation of the
        monochromatic values of the "i"th row.
    ImgStd2(i) = stDev(lumImg(i+1)); % determine the standard deviation of the
        monochromatic values of the "(i+1)"th row.
    RowStdDiff(i) = abs(ImgStd(i) – ImgStd2(i)); % determine the absolute value of the
        result of subtracting each standard deviation for the "(i+1)"th row from
        the standard deviation for the "i"th row.
    wRowStdDiff(i) = RowStdDiff(i) * ImgMean(i); % Weight the difference of the
        standard deviation for each row with the mean of the row's pixel values.
        This puts more weight on higher intensity values thus making them easier
        to be detected and more robust against noise.
End.
[barcheck1,upperBar1,lowerBar1] = checkBars(RowStdDiff);
```

```
[barcheck2,upperBar2,lowerBar2] = checkBars(wRowStdDiff);
if barCheck1 == 1
  return upperBar1,lowerBar1
    % if a black bar comprising M rows is identified at the top of the image, and a
    black bar comprising N rows (where N is at least substantially equal to M) is
    also identified at the bottom of the image, from differences between the
    unweighted standard deviation values of adjacent rows, then generate a value
    indicating that the two bars have been identified.
elseif barCheck2 == 1
  return upperBar2,lowerBar2
    % if it is not true that black bars (each comprising an identical or substantially
    similar number of rows) are identified at the top and bottom of the image from
    differences between the unweighted standard deviation values of adjacent rows,
    but it is true that black bars (each comprising an identical or substantially similar
    number of rows) are identified at the top and bottom of the image from
    differences between the weighted standard deviation values of adjacent rows,
    then generate a value indicating that the two bars have been identified.
    else
end.   % symmetric black bars have not been identified, so that any tentatively
    identified black bar (near the top or bottom of the image) should be
    considered part of a non-black image region of the image, and should not
    be considered to be a black bar.
```

The pseudocode of the function checkBars is:

```
function [barcheck,upperBar,lowerBar] = checkBars(valueVector)
thresholdVector = find valueVector > threshold
upperBar       = first crossing of threshold in thresholdVector
lowerBar       = last crossing of threshold in thresholdVector
barDifference = abs(upperBar – lowerBar)
if barDifference < symMargin
  if upperBar > minAbsoluteBarSize
    barCheck = 1;
      end    % This identifies, as a candidate top black bar boundary (edge), the first
        row (nearest to the top edge) whose value (weighted or unweighted
        standard deviation value) exceeds the predetermined "threshold" value,
        and identifies, as a candidate bottom black bar boundary, the last row
        (the row nearest to the bottom edge) whose value (weighted or
        unweighted standard deviation value) exceeds the threshold, checks the
        symmetry of identified candidate top and bottom black bars, if any (this
        is given by "symMargin" which determines whether the difference
        between the widths of candidate top and bottom black bars is within a
        predetermined maximum difference) and checks that the bars are
        reasonably wide (this is given by "minAbsoluteBarSize").
end
```

Aspects of the invention include systems (e.g., display system 1 or processor 3 of FIG. 1) and devices (e.g., processor 3 of FIG. 1) configured (e.g., programmed) to perform any embodiment of the inventive method, In some embodiments, a device (e.g., processor 3 of FIG. 1) of the inventive system is or includes a field-programmable gate array (FPGA), or other integrated circuit or chip set, programmed and/or otherwise configured to perform steps of an embodiment of the inventive method in response to data asserted thereto. In some embodiments, a device (e.g., processor 3 of FIG. 1) of the inventive system is a programmable digital signal processor (DSP) programmed and/or otherwise configured to perform processing, including steps of an embodiment of the inventive method, on data. For example, processor 3 of FIG. 1 may be implemented as a GPU. Alternatively, a device (e.g., processor 3 of FIG. 1) of the inventive system includes a programmable general purpose processor (e.g., a PC or other computer system or microprocessor) or a computer system including a processor, an input device, a memory, and a graphics card, coupled to receive or to generate input data, and programmed with software or firmware and/or otherwise configured (e.g., in response to control data) to perform any of a variety of operations on the input data, including steps of an embodiment of the inventive method. A general purpose processor configured to perform steps of an embodiment of the inventive method would typically be coupled to an input device (e.g., a mouse and/or a keyboard), a memory, and a display device.

Another aspect of the invention is a computer readable medium (e.g., a disc) which stores code for implementing any embodiment of the inventive method.

While specific embodiments of the present invention and applications of the invention have been described herein, it will be apparent to those of ordinary skill in the art that many variations on the embodiments and applications described herein are possible without departing from the scope of the invention described and claimed herein. It should be understood that while certain forms of the invention have been shown and described, the invention is not to be limited to the specific embodiments described and shown or the specific methods described.

What is claimed is:

1. A method for identifying a boundary of at least one black bar in an image determined by lines of pixels, where the pixels determine the black bar and at least one non-black image region, and said black bar is between the non-black image region and an edge of the image, said method including steps of:

(a) for each line of at least a subset of the lines, determining a standard deviation value and a difference value, where the standard deviation value is indicative of the standard deviation of pixel values for the line, and the difference value is the absolute value of the difference between the standard deviation value for said line and the standard deviation value for one of the lines adjacent to said line;

(b-1) determining whether any line of the at least a subset of the lines satisfies a criterion that its difference value exceeds a predetermined threshold but the difference value for each other line of the at least a subset of lines to be displayed nearer to a first edge of the image does not exceed the threshold; and (b-2) identifying one of the lines as a black bar boundary in response to the step of determining.

2. The method of claim 1, wherein each of the pixel values for each said line is a monochromatic value generated in response to one of the pixels in the line.

3. The method of claim 1, also including the step of:

(c-1) for each line of the at least a subset of the lines, determining a product value, M·σ, and a product difference value, where M is the mean of pixel values for the line whose product and product difference values are being determined, σ is a standard deviation of pixel values for the line whose product and product difference values are being determined, and the product difference value is an absolute value of a difference between the product value for the line whose product and product difference values are being determined and a product value for any line adjacent thereto; and (c-2) if none of the lines of the at least a subset of the lines has been identified as a black bar boundary in step (b-2), identifying one of the lines of the at least a subset of the lines as a black bar boundary based on the product difference values such that the line identified as a black bar boundary has a product difference value that exceeds a second threshold and that the product difference value for each of the lines to be displayed nearer to the first edge than the line identified as the black bar boundary, does not exceed the second threshold.

4. The method of claim 1, also including the step of:

(c) determining whether any of the lines of the at least a subset of the lines satisfies a criterion that a difference value exceeds the threshold but the difference value for each other line of the at least a subset of the lines to be displayed nearer to a second edge of the image does not exceed the threshold, where the second edge and the first edge of the image are opposite edges of the image, and identifying one of the lines as a second black bar boundary in response to determining that the difference value for a line exceeds the threshold and that difference values for each of the lines to be displayed nearer to the second edge than the line that exceeds the threshold do not exceed the threshold.

5. The method of claim 4, also including the step of:

(d-1) for each line of the at least a subset of the lines, determining a product value, M·σ, and a product difference value, where M is the mean of pixel values for the line whose product and product difference values are being determined, σ is the standard deviation of the pixel values for the line whose product and product difference values are being determined, and the product difference value is an absolute value of a difference between the product value for the line whose product and product difference values are being determined and the product value for one of the lines adjacent to the line whose product and product difference values are being determined; and (d-2) if none of the lines of the at least a subset of the lines has been identified as a black bar boundary in step (b-2), identifying one of the lines of the at least a subset of the lines as a black bar boundary based on the product difference values such that the line identified as a black bar boundary has a product difference value that exceeds a second threshold and that the product difference value for each line to be displayed nearer to the first edge than the line identified as a black bar boundary does not exceed the second threshold.

6. The method of claim 4, also including the step of:

identifying black bars between the first edge of the image and the black bar boundary and between the second edge of the image and the second black bar boundary, in response to identifying one of the lines as the black bar boundary in step (b-2), identifying another one of the lines as the second black bar boundary in step (c), and determining that the black bar boundary and the second black bar boundary satisfy a symmetry criterion.

7. The method of claim 6, wherein the symmetry criterion is that the black bar boundary is N lines from the first edge of the image, the second black bar boundary is M lines from the second edge of the image, and the absolute value of the difference between N and M is not greater than a predetermined value.

8. The method of claim 4, also including the step of:

(d-1) if steps (b-2) and (c) do not result in identification of one of the lines as the black bar boundary and another one of the lines as the second black bar boundary, determining for each line of the at least a subset of the lines, a product value, M·σ, and a product difference value, where M is the mean of pixel values for the line whose product and product difference values are being determined, a is the standard deviation of the pixel values for the line whose product and product difference values are being determined, and the product difference value is an absolute value of a difference between the product value for the line whose product and product difference values are being determined and the product value for any line adjacent to the line whose product and product difference values are being determined, identifying a black bar boundary line having a product difference value exceeding the second threshold and that the product difference value, for each line to be displayed nearer to the first edge than the black boundary line, does not exceed the second threshold, and identifying a second black bar boundary line having a product difference value exceeding the second threshold and that the product difference value, for each line to be displayed nearer to the second edge than the second black boundary line does not exceed the second threshold.

9. The method of claim 8, also including the step of:

(e) identifying black bars between the first edge of the image and the black bar boundary and between the second edge of the image and the second black bar boundary, in response to identifying one of the lines as the black bar boundary in step (e), and identifying another one of the lines as the second black bar boundary in step (e), and determining that the black bar boundary and the second black bar boundary satisfy a symmetry criterion.

10. The method of claim 9, wherein the symmetry criterion is that the black bar boundary is N lines from the first edge of the image, the second black bar boundary is M lines from the second edge of the image, and the absolute value of the difference between N and M is not greater than a predetermined value.

11. A method for identifying a boundary of at least one black bar in an image determined by lines of pixels, where the pixels determine the black bar and at least one non-black image region, and said black bar is between the non-black image region and an edge of the image, said method including steps of:
(a) for each line of at least a subset of the lines, determining a product value and a difference value, where the product value is proportional to M·σ, where M is the mean of pixel values for the line, σ is the standard deviation of the pixel values for the line, and the difference value is the absolute value of the difference between the product value for said line and the product value for one of the lines adjacent to said line; and
(b-1) determining whether any of the lines of the at least a subset of lines satisfies a criterion that the difference value exceeds a predetermined threshold but the difference value for each other line of the at least a subset of lines to be displayed nearer to a first edge of the image does not exceed the threshold; and
(b-2) identifying one of the lines as a black bar boundary in response to the step of determining.

12. The method of claim 11, wherein each of the pixel values for each line is a monochromatic value generated in response to one of the pixels in the line.

13. The method of claim 11, also including the step of:
(c-1) determining whether any of the lines of the at least a subset of lines satisfies a criterion that its difference value exceeds the threshold but the difference value for each other line of the at least a subset of lines to be displayed nearer to a second edge of the image does not exceed the threshold, where the second edge and the first edge of the image are opposite edges of the image; and
(c-2) identifying one of the lines as a second black bar boundary in response to step (c-1).

14. The method of claim 13, also including the step of:
(d) identifying black bars between the first edge of the image and the black bar boundary and between the second edge of the image and the second black bar boundary, in response to identifying one of the lines as the black bar boundary in step (b), identifying another one of the lines as the second black bar boundary in step (c), and determining that the black bar boundary and the second black bar boundary satisfy a symmetry criterion.

15. The method of claim 14, wherein the symmetry criterion is that the black bar boundary is N lines from the first edge of the image, the second black bar boundary is M lines from the second edge of the image, and the absolute value of the difference between N and M is not greater than a predetermined value.

16. The method of claim 11, also including the step of:
(c) for each line of the at least a subset of the lines, determining a standard deviation, σ, and a standard deviation difference value, where σ is the standard deviation of pixel values for the line whose standard deviation and standard deviation difference values are being determined, and the standard deviation difference value is an absolute value of a difference between the standard deviation for the line whose standard deviation and standard deviation difference values are being determined and the standard deviation for a line adjacent to the line whose standard deviation and standard deviation difference values are being determined, and if none of the lines has been identified as a black bar boundary in step (b), identifying a black bar boundary line having a standard deviation difference value that exceeds a second threshold and that the standard deviation difference value, for each line to be displayed nearer to the first edge than the black boundary line does not exceed the second threshold.

17. A system configured to identify a boundary of at least one black bar in an image determined by lines of pixels, where the pixels determine the black bar and at least one non-black image region, and said black bar is between the non-black image region and an edge of the image, said system including:
at least one input coupled to receive image data indicative of the image; and
a subsystem configured to process the image data, including by:
(a) determining, for each line of at least a subset of the lines, a standard deviation value and a difference value, where the standard deviation value is indicative of the standard deviation of pixel values for the line whose standard deviation and difference values is being determined, and the difference value is an absolute value of a difference between the standard deviation value for the line whose standard deviation and difference values is being determined and the standard deviation value for a line adjacent thereto; and
(b) determining whether any of the lines satisfies a criterion that its difference value exceeds a predetermined threshold but difference values for lines to be displayed nearer to a first edge of the image than is the line whose standard deviation and difference values is being determined does not exceed the threshold, and identifying a black bar boundary line whose difference value exceeds the threshold and that difference values for each line to be displayed nearer to the first edge than the black boundary line is said one of the lines, does not exceed the threshold.

18. The system of claim 17, wherein each of the pixel values is a monochromatic value, and the subsystem is configured to generate each said monochromatic value in response to a different one of the pixels.

19. The system of claim 17, wherein the subsystem is also configured:
(c) to determine, for each line of at the least a subset of the lines, a product value, M·σ, and a product difference value, where M is the mean of pixel values for the line whose product and product difference values are being determined, σ is the standard deviation of the pixel values for the line whose product and product difference values are being determined, and the product difference value is an absolute value of a difference between the product value for the line whose product and product difference values are being determined and the product value for a line adjacent to the line whose product and product difference values are being determined, and if none of the lines has been identified as a black bar boundary in step (b), to identify one of the lines as a black bar boundary line having a product difference value that exceeds a second threshold and that the product difference values for each line to be displayed nearer to the first edge than the black boundary line does not exceed the second threshold.

20. The system of claim 17, wherein the subsystem is also configured:
(c) to determine whether any of the lines satisfies the criterion that the difference value for the line exceeds the threshold but the difference value for each other one of the lines to be displayed nearer to a second edge of the image than is said line does not exceed the threshold, where the second edge and the first edge of the image are opposite edges of the image, and to identify one of the lines as a second black bar boundary in response to determining that the difference value for said one of the lines exceeds the threshold and that the difference value for each of the lines to be displayed nearer to the second edge than is said one of the lines does not exceed the threshold.

21. The system of claim 20, wherein the subsystem is also configured to determine, for each line of at least a subset of the lines, a product value, M·σ, and a product difference value, where M is the mean of pixel values for said line, σ is the standard deviation of the pixel values for said line, and the product difference value is the absolute value of the difference between the product value for said line and the product value for one of the lines adjacent to said line, and if none of the lines has been identified as a black bar boundary in step (b), to identify one of the lines as a black bar boundary in response to determining that the product difference value for said one of the lines exceeds a second threshold and that the product difference value, for each of the lines to be displayed nearer to the first edge than is said one of the lines, does not exceed the second threshold.

22. The system of claim 20, wherein the subsystem is also configured to identify black bars between the first edge of the image and the black bar boundary and between the second edge of the image and the second black bar boundary, in response to identifying one of the lines as the black bar boundary in step (b), identifying another one of the lines as the second black bar boundary in step (c), and determining that the black bar boundary and the second black bar boundary satisfy a symmetry criterion.

23. The system of claim 22, wherein the symmetry criterion is that the black bar boundary is N lines from the first edge of the image, the second black bar boundary is M lines from the second edge of the image, and the absolute value of the difference between N and M is not greater than a predetermined value.

24. The system of claim 20, wherein the subsystem is also configured to determine for each line of at least a subset of the lines, if steps (b) and (c) do not result in identification of one of the lines as the black bar boundary and another one of the lines as the second black bar boundary, a product value, M·σ, and a product difference value, where M is the mean of pixel values for said line, σ is the standard deviation of the pixel values for said line, and the product difference value is the absolute value of the difference between the product value for said line and the product value for one of the lines adjacent to said line, to identify one of the lines as the black bar boundary in response to determining that the product difference value for said one of the lines exceeds a second threshold and that the product difference value, for each of the lines to be displayed nearer to the first edge than is said one of the lines, does not exceed the second threshold, and to identify another one of the lines as the second black bar boundary in response to determining that the product difference value for said another one of the lines exceeds the second threshold and that the product difference value, for each of the lines to be displayed nearer to the second edge than is said another one of the lines, does not exceed the second threshold.

25. The system of claim 24, wherein the subsystem is also configured to identify black bars between the first edge of the image and the black bar boundary and between the second edge of the image and the second black bar boundary, in response to identifying one of the lines as the black bar boundary, identifying another one of the lines as the second black bar boundary, and determining that the black bar boundary and the second black bar boundary satisfy a symmetry criterion.

26. The system of claim 25, wherein the symmetry criterion is that the black bar boundary is N lines from the first edge of the image, the second black bar boundary is M lines from the second edge of the image, and the absolute value of the difference between N and M is not greater than a predetermined value.

27. The system of claim 17, wherein said system is a display device, and the subsystem is a processor of the display device.

28. The system of claim 17, wherein said system is a processor.

29. The system of claim 17, wherein said system is a digital signal processor.

30. A system configured to identify a boundary of at least one black bar in an image determined by lines of pixels, where the pixels determine the black bar and at least one non-black image region, and said black bar is between the non-black image region and an edge of the image, said system including:
at least one input coupled to receive image data indicative of the image; and
a subsystem configured to process the image data, including by:
(a) determining, for each line of at least a subset of the lines, a product value and a difference value, where the product value is proportional to M·σ, where M is the mean of pixel values for the line, σ is the standard deviation of the pixel values for the line, and the difference value is the absolute value of the difference between the product value for said line and the product value for one of the lines adjacent to said line; and
(b) determining whether any of the lines of the at least a subset satisfies a criterion that a difference value exceeds a predetermined threshold and a difference value for each other line to be displayed nearer to a first edge of the image does not exceed the threshold, and identifying one of the lines as a black bar boundary in response thereto.

31. The system of claim 30, wherein each of the pixel values is a monochromatic value, and the subsystem is configured to generate each said monochromatic value in response to a different one of the pixels.

32. The system of claim 30, wherein the subsystem is also configured:
(c) to determine whether any of the lines of the at least a subset satisfies a criterion that its difference value exceeds the threshold but difference values for each other line to be displayed nearer to a second edge of the image does not exceed the threshold, where the second edge and the first edge of the image are opposite edges of the image, and to identify one of the lines as a second black bar boundary in response thereto.

33. The system of claim 32, wherein the subsystem is also configured to identify black bars between the first edge of the image and the black bar boundary and between the second edge of the image and the second black bar boundary, in response to identifying one of the lines as the black bar boundary in step (b), identifying another one of the lines as the second black bar boundary in step (c), and determining that the black bar boundary and the second black bar boundary satisfy a symmetry criterion.

34. The system of claim 33, wherein the symmetry criterion is that the black bar boundary is N lines from the first edge of the image, the second black bar boundary is M lines from the second edge of the image, and the absolute value of the difference between N and M is not greater than a predetermined value.

35. The system of claim 30, wherein said system is a display device, and the subsystem is a processor of the display device.

36. The system of claim 30, wherein said system is a processor.

37. The system of claim 30, wherein said system is a digital signal processor.

* * * * *